United States Patent [19]

Kutnyak et al.

[11] 4,304,266
[45] Dec. 8, 1981

[54] SMOOTH BORE FLEXIBLE HOSE

[75] Inventors: Thomas A. Kutnyak, Greenwood; Marvin A. Koerber, Abbeville, both of S.C.

[73] Assignee: Automation Industries, Inc., Greenwich, Conn.

[21] Appl. No.: 133,418

[22] Filed: Mar. 24, 1980

[51] Int. Cl.³ .................... F16L 11/08; F16L 11/11
[52] U.S. Cl. .................................. 138/129; 138/133; 138/154
[58] Field of Search ............... 138/129, 154, 133, 132, 138/137, 122, 125

[56] References Cited

U.S. PATENT DOCUMENTS

| 2,674,297 | 4/1954 | Greenwald | 138/125 |
| 3,323,553 | 6/1967 | Richitelli et al. | 138/122 |
| 4,098,298 | 7/1978 | Vohrer | 138/133 |
| 4,224,463 | 9/1980 | Koerber et al. | 138/122 |

Primary Examiner—Willis Little
Attorney, Agent, or Firm—Francis N. Carten

[57] ABSTRACT

A helically fabricated flexible hose having a self-supporting helical reinforcing element of non-circular cross-section with a flat side facing inwardly, thereby imparting a substantially smooth surface to the hose interior.

7 Claims, 5 Drawing Figures

SMOOTH BORE FLEXIBLE HOSE

BACKGROUND OF THE INVENTION

Flexible hose of the type commonly used for vacuum cleaners has been constructed of an outer wall of helically wrapped plastic strip, a self-supporting helical reinforcing element inside the outer wall and often a plastic liner inside the reinforcing element. The reinforcing element has typically been of composite form comprising an inner metal round wire about which a cylindrical plastic sheath is extruded, so that the plastic sheath can be bonded to both the outer wall of the hose and to the liner. The hose structure is usually formed on a mandrel with the plastic strips for the wall and liner extruded as they are applied. These plastic elements are therefore initially soft and somewhat deformable.

Because of the circular cross-section of the reinforcing element it has a tendency to penetrate into and at times through the soft plastic inner ply. This penetration has been the cause of a relatively high product rejection rate. Also there is a small gap or delamination region on both sides of the wire due to its round cross-sectional shape. When the hose is flexed or bent at right angles the liner at these delaminated areas tends to convolute inwardly on the inside of the hose and thus cause air friction loss and air turbulence.

SUMMARY OF THE INVENTION

The invention provides a helically fabricated flexible hose with a substantially smooth interior surface. The hose includes at least one strip wrapped helically with successive convolutions overlapping and forming a flexible hose wall of at least one ply. At least one self-supporting helical reinforcing element is concentric with and engages the wall. The reinforcing element has a non-circular cross-section with a substantially flat side facing inwardly toward the hose interior. In a preferred form of the invention the reinforcing element is of composite construction and comprises an inner wire of circular cross-section and an outer sheath which is formed with the above-mentioned flat side facing toward the hose interior. The wall strip and this outer sheath may be of plastic material and may be bonded together. The side of the reinforcing element opposite the flat side is preferably substantially rounded. An inner flexible liner may be disposed inside the helically reinforced element.

The flat side of the reinforcing element insures that the hose has a substantially smooth inner surface. This in turn provides improved air flow characteristics as compared to the prior art structures and prevents foreign particles from collecting within the hose. The somewhat triangular shape of the reinforcing element fills in the voids between the liner and outer wall ply to each side of the reinforcing element and this eliminates any problem of delamination in those areas. The torsion cycle life of the hose is thereby improved and the hose is less susceptible to cracking. Other objects and advantages of the invention will become apparent in the following description of a preferred embodiment taken in conjunction with the accompanying drawings.

DESCRIPTION OF THE PREFERRED EMBODIMENT

Figure 1:
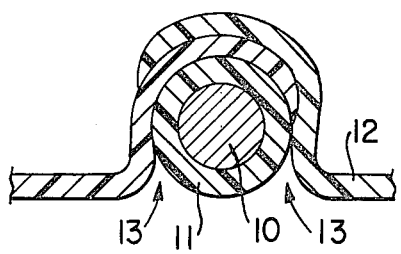
FIG. 1 is an enlarged fragmentary cross-section of the prior art form wherein the reinforcing element is of round cross-section.

In the prior art structure illustrated in FIG. 1 a reinforcing element consists of an inner metal wire 10 of circular cross-section. The wire 10 in the prior art is enclosed within a plastic sheath 11 of cylindrical cross-section. This coated wire is pre-formed into helical shape immediately adjacent the mandrel upon which the hose is formed. At least one plastic strip 12 is wrapped helically with successive convolutions overlapping, preferably over the reinforcing element as shown in FIG. 1, to form a flexible hose wall of at least one ply. (The location and extent of this overlap are shown in FIG. 1 only for purposes of illustration.) To each side of this reinforcing element voids 13 are necessarily formed which produce irregularities on the inside surface of the hose wall. It is these irregularities which cause air friction loss and air turbulence. Also, it has been observed that foreign particles can collect within the voids 13 under some circumstances. While it is not shown in FIG. 1, an inner plastic liner is frequently located inside the wall 12 and the round reinforcing element tends to penetrate such a liner while it is initially soft and deformable.

Various thermoplastic materials have been used for the elements of such a hose. Extruded polyvinyl chloride, ethylene vinyl acetate, polyethelene or polypropylene are commonly employed for the purpose and such solvents such as tetrahydrafuran are applied to the interfaces between the sheath 10 and the wall strip 12, and also the liner if one is employed, to bond the elements together.

Figure 2:
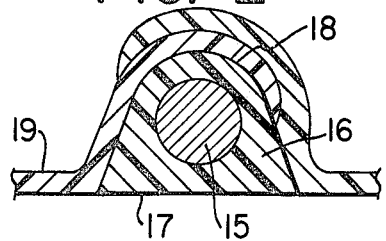
FIG. 2 is a similar enlarged fragmentary section of the improved reinforcing element with the flat inward side.

Referring now to FIG. 2 the improved reinforcing element structure is shown to include a circular metal wire 15 covered with an outer plastic sheath 16 of non-circular cross-section. The sheath 16 has a substantially flat side 17 facing inwardly toward the hose interior and a substantially rounded side 18 engages a wall strip 19. The plastic sheath 16 is bonded to the wall 19 by a solvent or otherwise in the manner of the prior art.

Figure 3:
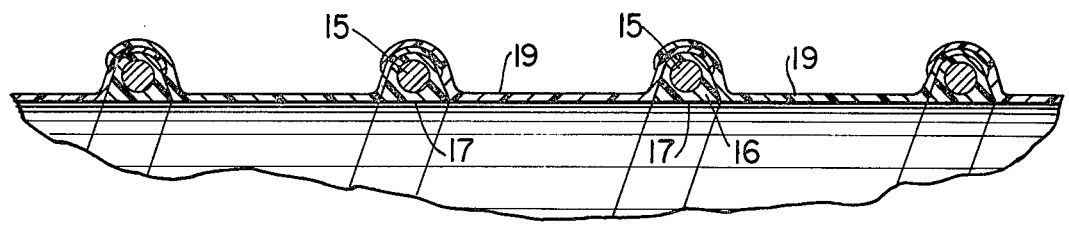
FIG. 3 is a fragmentary section of one form of the hose wall with the improved reinforcing element.

FIG. 3 shows the full wall of a hose formed as in FIG. 2. As a consequence of the flat side 17 of the reinforcing element the interior surface or bore of the hose is substantially smooth. The voids 13 of the prior art are eliminated and the air flow properties of the product are thus improved. Collection of foreign particles within the hose is effectively prevented.

Figure 4:
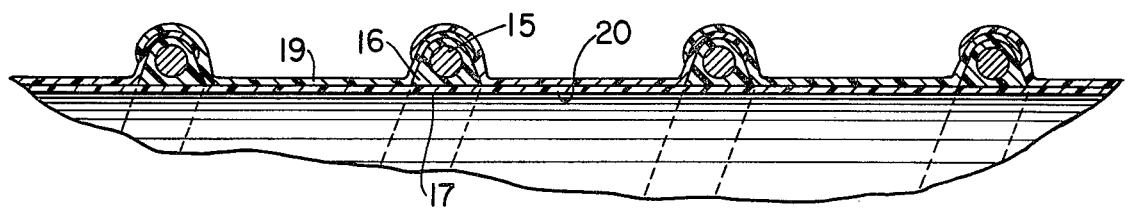
FIG. 4 is a fragmentary section of another form of the hose wall with the improved reinforcing element.

FIG. 4 shows another embodiment of hose with the improved reinforcing element and it differs from that described above in that a flexible helically wrapped plastic liner 20 is disposed inside the reinforcing element. The sheath 16 of the reinforcing element is bonded to both the liner 20 and the wall 19. With prior art reinforcing elements of round cross-section, a liner of this type tends to be indented or penetrated while initially soft and deformable. However, because of the flat side 17 provided by the invention the reinforcing element does not damage the liner in this fashion.

Figure 5:
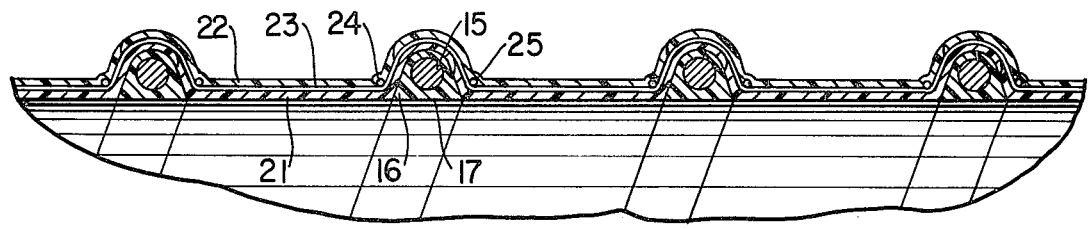
FIG. 5 is a fragmentary section of a third form of the hose wall with the improved reinforcing element.

FIG. 5 illustrates still another form of hose with the flat-sided reinforcing element of the invention. It is characterized by inner and outer helically wrapped strips 21 and 22 respectively which form a multiple ply hose wall. A plurality of longitudinal reinforcing cords 23 are circumferentially spaced about the inner ply 21 of the hose wall. Respective pairs of helical reinforcing cords 24 and 25 are wrapped about the inner ply 21 of the hose wall adjacent each of the turns of the helical reinforcing element. The outer ply 22 surrounds all of the reinforcing cords 23, 24 and 25. No delamination occurs with the flat-sided reinforcing element of the invention and consequently the problem of the liner convoluting inwardly does not take place.

The non-circular flat-sided form of reinforcing element described above results in a flexible hose with reduced air resistance and improved adhesion, torsion characteristics and flexibility. The scope of the invention is not to be limited to the specific embodiment described above but rather to the following claims.

We claim:

1. A helically fabricated flexible hose with a substantially smooth interior surface comprising
   (a) at least one plastic strip wrapped helically with successive convolutions overlapping and forming a flexible hose wall of at least one ply, and
   (b) at least one self-supporting helical reinforcing element concentric with and engaging the inside of said wall, and
   (c) said reinforcing element being of composite construction comprising
      i. an inner metal wire of circular cross-section, and
      ii. an outer plastic sheath of non-circular cross-section totally enclosing said wire and having a substantially flat side facing inwardly toward the hose interior and an opposite substantially rounded side engaging the wall strip, said flat side being substantially spaced from said wire and
      iii. the plastic sheath being bonded to the plastic wall strip.

2. A helically fabricated flexible hose according to claim 1 wherein a flexible helically fabricated plastic liner is disposed inside the helical reinforcing element, and the outer sheath of the reinforcing element is bonded to both the liner and the wall strip.

3. A helically fabricated flexible hose according to claim 1 which includes
   (a) inner and outer helically wrapped strips forming a multiple ply hose wall,
   (b) a plurality of longitudinal reinforcing cords circumferentially spaced about the inner ply of the hose wall, and
   (c) respective pairs of helical reinforcing cords wrapped about the inner ply of the hose wall adjacent each of the turns of the helical reinforcing element
   (d) the outer ply of the hose wall surrounding all of the reinforcing cords.

4. A helically fabricated flexible hose with a substantially smooth interior surface comprising:
   (a) at least one strip wrapped helically with successive convolutions overlapping and forming a flexible hose wall of at least one ply, and
   (b) at least one self-supporting helical reinforcing element concentric with and engaging said wall,
   (c) said reinforcing element being of composite construction comprising
      (i) an inner wire, and
      (ii) an outer plastic sheath of non-circular construction totally enclosing said wire and having a substantially flat side facing inwardly toward the hose interior and an opposite substantially rounded side engaging the wall strip said flat side being substantially spaced from said wire.

5. A helically fabricated flexible hose according to claim 4 wherein the wall strip is of the same plastic as and is bonded to the sheath of the inner wire.

6. A helically fabricated flexible hose according to claim 4 wherein the reinforcing element is inside the wall formed by the strip.

7. A helically fabricated flexible hose according to claim 6 wherein a flexible liner is disposed inside the helical reinforcing element.

* * * * *